United States Patent
Shibazaki et al.

(10) Patent No.: US 12,495,192 B2
(45) Date of Patent: Dec. 9, 2025

(54) CAMERA MODULE AND ELECTRONIC DEVICE WITH HEAT DISSIPATING MEMBER

(71) Applicant: SONY SEMICONDUCTOR SOLUTIONS CORPORATION, Kanagawa (JP)

(72) Inventors: Shunichiro Shibazaki, Kanagawa (JP); Kozo Hoshino, Kanagawa (JP); Shinichi Yuzuki, Kanagawa (JP); Tetsuya Nakagawa, Kanagawa (JP); Kiyohiro Saito, Kanagawa (JP); Yuta Shishido, Kanagawa (JP); Kazumi Kobayashi, Kanagawa (JP); Nobuyuki Watanabe, Kanagawa (JP); Masaki Hoshino, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 62 days.

(21) Appl. No.: 18/043,965

(22) PCT Filed: Sep. 10, 2021

(86) PCT No.: PCT/JP2021/033251
§ 371 (c)(1),
(2) Date: Mar. 3, 2023

(87) PCT Pub. No.: WO2022/065067
PCT Pub. Date: Mar. 31, 2022

(65) Prior Publication Data
US 2023/0328346 A1    Oct. 12, 2023

(30) Foreign Application Priority Data
Sep. 24, 2020    (JP) ................... 2020-159310

(51) Int. Cl.
H04N 5/335    (2011.01)
H04N 23/52    (2023.01)
H04N 23/54    (2023.01)

(52) U.S. Cl.
CPC ............. H04N 23/52 (2023.01); H04N 23/54 (2023.01)

(58) Field of Classification Search
CPC .................................................... H04N 23/52
See application file for complete search history.

(56) References Cited

U.S. PATENT DOCUMENTS

2009/0003814 A1    1/2009    Okamura et al.
2009/0273693 A1    11/2009   Aoki et al.
2016/0301875 A1    10/2016   Iwasaki

FOREIGN PATENT DOCUMENTS

JP    2006191465 A    *    7/2006
JP    2007-162889          6/2007
(Continued)

OTHER PUBLICATIONS

International Search Report and Written Opinion prepared by the Japan Patent Office on Nov. 15, 2021, for International Application No. PCT/JP2021/033251, 2 pgs.

*Primary Examiner* — Gary C Vieaux
(74) *Attorney, Agent, or Firm* — Sheridan Ross PC

(57) ABSTRACT

The present disclosure relates to a camera module and an electronic device that can improve heat dissipation. A movable member has an image sensor on a front side and is movable in a direction along an imaging surface of the image sensor, the fixed member is fixed with a predetermined gap interposed between the fixed member and the movable member on a back side of the movable member, and at least one heat dissipating member is fixed to at least one of the fixed member and the movable member and is in (Continued)

contact with the other in the gap. The present disclosure is applicable to a camera module of a sensor-shift system.

20 Claims, 26 Drawing Sheets

(56) References Cited

FOREIGN PATENT DOCUMENTS

| | | | |
|---|---|---|---|
| JP | 2009-011097 | | 1/2009 |
| JP | 2009-272789 | | 11/2009 |
| JP | 2009284414 | A * | 12/2009 |
| JP | 2012-217179 | | 11/2012 |
| JP | 2012217179 | A * | 11/2012 |
| JP | 2020-060726 | | 4/2020 |
| JP | 2023107288 | A * | 8/2023 |

* cited by examiner

CAMERA MODULE AND ELECTRONIC DEVICE WITH HEAT DISSIPATING MEMBER

CROSS REFERENCE TO RELATED APPLICATIONS

This application is a national stage application under 35 U.S.C. 371 and claims the benefit of PCT Application No. PCT/JP2021/033251, having an international filing date of 10 Sep. 2021, which designated the United States, which PCT application claimed the benefit of Japanese Patent Application No. 2020-159310, filed 24 Sep. 2020, the entire disclosures of each of which are incorporated herein by reference.

TECHNICAL FIELD

The present disclosure relates to a camera module and an electronic device and particularly relates to a camera module and an electronic device that can improve heat dissipation.

BACKGROUND ART

Known as a technique for camera shake compensation is a sensor-shift system in which an image sensor is moved instead of a lens in a direction orthogonal to the incident direction of light.

For example, PTL 1 discloses an imaging-element drive unit configured to support an imaging element assembly, which is designed to move relative to a fixed part, by an electromagnetic force such that the imaging element assembly can move relative to the fixed part.

CITATION LIST

Patent Literature

[PTL 1]
JP 2020-60726A

SUMMARY

Technical Problem

However, a structure of the sensor-shift system has an air gap under a movable member, on which an image sensor is mounted, (on the opposite side from the imaging surface of the image sensor) and thus such a structure is disadvantageous to heat dissipation.

The present disclosure has been devised in view of such circumstances. An object of the present disclosure is to improve heat dissipation.

Solution to Problem

A camera module of the present disclosure is a camera module including: an image sensor; a movable member that has the image sensor on the front side and is movable in a direction along the imaging surface of the image sensor; a fixed member that is fixed with a predetermined gap interposed between the fixed member and the back side of the movable member; and at least one heat dissipating member that is fixed to at least one of the fixed member and the movable member and is in contact with the other in the gap.

An electronic device of the present disclosure is an electronic device including a camera module, the camera module including: an image sensor; a movable member that has the image sensor on the front side and is movable in a direction along the imaging surface of the image sensor; a fixed member that is fixed with a predetermined gap interposed between the fixed member and the movable member on the back side of the movable member; and at least one heat dissipating member that is fixed to at least one of the fixed member and the movable member and is in contact with the other in the gap.

In the present disclosure, the movable member has the image sensor on the front side and is movable in a direction along the imaging surface of the image sensor, the fixed member is fixed with a predetermined gap interposed between the fixed member and the movable member on the back side of the movable member, and the at least one heat dissipating member is fixed to at least one of the fixed member and the movable member and is in contact with the other in the gap.

DESCRIPTION OF EMBODIMENTS

Hereinafter, modes for carrying out the present disclosure (hereinafter referred as embodiments) will be described. The description will be made in the following order.
1. Configuration of Camera Module
2. First Embodiment (a configuration having a plurality of bumps on the top surface of a fixed member)
3. Second Embodiment (a configuration having a single bump on the top surface of a fixed member)
4. Third Embodiment (a configuration having a gap filled with a gel material)
5. Fourth Embodiment (a configuration having vias on a movable member)
6. Fifth Embodiment (a configuration having a radiator fin on the back side of a movable member)
7. Sixth Embodiment (a configuration having a fixed member with a tilted top surface)
8. Modification
9. Configuration of Electronic Device 1. Configuration of Camera Module FIG. 1 illustrates the appearance of a camera module to which the technique of the present disclosure is applied.

Figure 1:
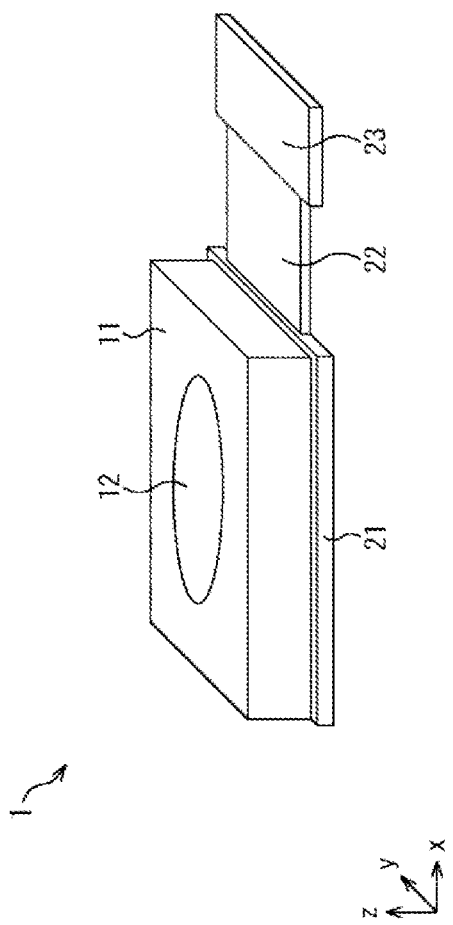
FIG. 1 illustrates the appearance of a camera module to which the technique of the present disclosure is applied.

A camera module 1 in FIG. 1 is configured as, for example, an imaging device integrated in a smartphone. The camera module 1 may be integrated into other electronic devices such as a tablet and a portable PC (Personal Computer) in addition to a smartphone. The camera module 1 is a camera module of a sensor-shift system in which an image sensor is moved in a direction orthogonal to the incident direction of light.

In the camera module 1, a cabinet 11 accommodates a lens unit 12 and an image sensor or the like, which is not illustrated. The cabinet 11 is made of, for example, a predetermined metal. The lens unit 12 is configured to support a plurality of lenses with a holder.

The cabinet 11 is fixed to, for example, a fixed member 21 configured as a stiffener that increases the strength of the overall camera module 1. The cabinet 11 directly fixed to the fixed member 21 may be indirectly fixed to the fixed member 21 via a predetermined member. The fixed member 21 may be configured as a printed circuit board (PCB).

One end of an FPC (Flexible Printed Circuit) 22 is connected to the fixed member 21, and a connector 23 is connected to the other end of the FPC 22. The camera module 1 is electrically connected via the FPC 22 and the connector 23 to a power supply and an electronic circuit in a smartphone containing the camera module 1.

Hereinafter, the x axis and the y axis are defined as two axes orthogonal to each other on a plane that is orthogonal to the incident direction of light (the direction of the optical axis of the lens unit 12), and the z axis is defined as the incident direction of light. It is assumed that the image sensor has an imaging surface on the xy plane.

Figure 2:
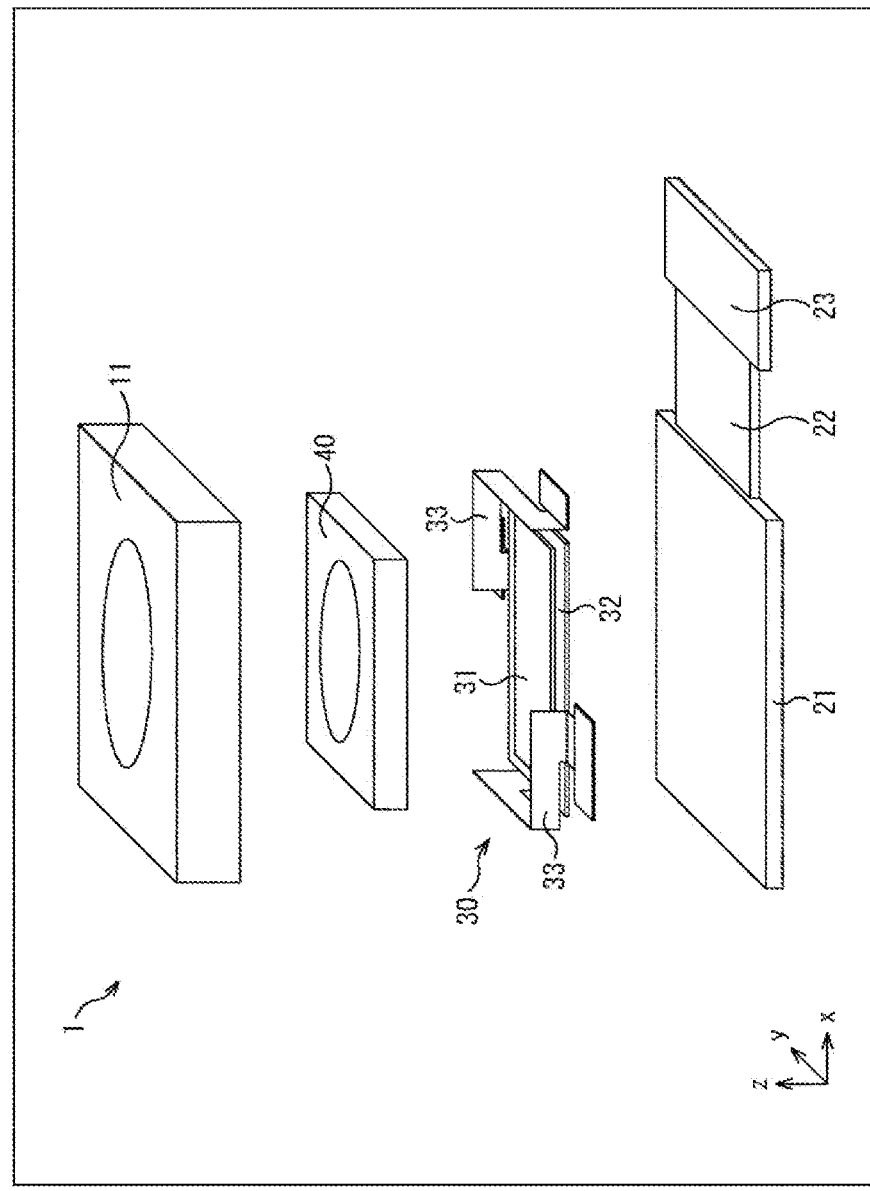
FIG. 2 illustrates a configuration example of the inside of the camera module.

FIG. 2 illustrates a configuration example of the inside of the camera module 1. In FIG. 2, the lens unit 12 is not illustrated.

In the cabinet 11 of the camera module 1, a movable body 30 is provided on the fixed member 21.

The movable body 30 includes an image sensor 31 and a movable member 32 on which the image sensor 31 is mounted. The movable member 32 is configured as, for example, a printed circuit board (PCB).

The fixed member 21 is fixed with a predetermined gap (air gap) interposed between the fixed member 21 and the back side of the movable member 32. Specifically, the movable body 30 (the movable member 32 on which the image sensor 31 is mounted) is movable in a direction along the imaging surface (xy plane) of the image sensor 31. In other words, the movable member 32 is assumed to be a first member that has the image sensor 31 on the surface and is movable in the direction along the imaging surface of the image sensor 31. The fixed member 21 is assumed to be a second member that is fixed with the predetermined gap interposed between the fixed member 21 and the back side of the first member. Moreover, the movable member 32 is assumed to be a first substrate that has the image sensor 31 on the surface and is movable in the direction along the imaging surface of the image sensor 31. The fixed member 21 is assumed to be a second substrate that is fixed with the predetermined gap interposed between the fixed member 21 and the back side of the first substrate.

The image sensor 31 is electrically connected to the power supply and the electronic circuit that are connected to the camera module 1, via the movable member 32 serving as a PCB and an FPC 33 provided around the movable member 32. The movable member 32 may be configured as an FPC integrated with the FPC 33.

In the cabinet 11 of the camera module 1, an actuator mechanical part 40 is provided on the movable body 30.

The actuator mechanical part 40 constitutes an actuator part with the cabinet 11 serving as a cover. The actuator mechanical part 40 acting as an actuator includes a coil, a magnet, and a resin support member that supports the coil and magnet. The actuator mechanical part 40 supports the movable body 30 suspended therefrom. The actuator mechanical part 40 enables camera shake compensation by moving the movable body 30 in response to the vibrations of the camera module 1 on the basis of a control signal from a control circuit, which is not illustrated. The actuator mechanical part 40 may enable automatic focusing by moving the movable body 30 in the z-axis direction as well as a direction along the xy plane.

Conventionally, a structure of the sensor-shift system like the camera module 1 has an air gap under the movable body 30 (the movable member 32 on which the image sensor 31 is mounted) and thus is disadvantageous to heat dissipation.

Hereinafter, an embodiment of the camera module 1 that can improve heat dissipation will be described.

2. First Embodiment

First Example of a Heat Dissipation Structure

Figure 3:
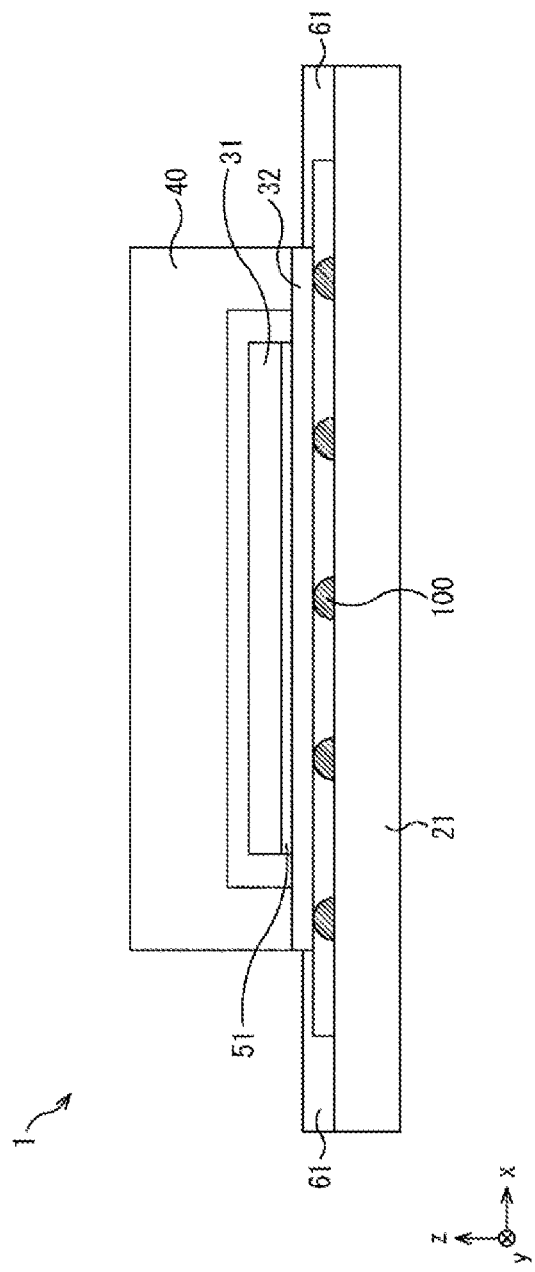
FIG. 3 is a cross-sectional view illustrating a configuration example of the camera module according to a first embodiment.

FIG. 3 is a cross-sectional view illustrating a configuration example of the camera module 1 according to a first embodiment. In FIG. 3, the cabinet 11 and the lens unit 12 are not illustrated.

In the camera module 1 of FIG. 3, the image sensor 31 is bonded onto a surface of the movable member 32 with a chip fixing material 51. The chip fixing material 51 is composed of a die attach film (DAF) and die-bonding materials such as adhesive and solder and has a thermal conducting property. Heat generated in the image sensor 31 is transmitted to the movable member 32 through the chip fixing material 51. On the movable member 32, the actuator mechanical part 40 is installed to cover the image sensor 31.

The movable member 32 is supported by the actuator mechanical part 40 with a predetermined gap formed on the fixed member 21. Around the movable member 32, an FPC 61 is provided as a part of the FPC 33. In the gap between the fixed member 21 and the movable member 32, a plurality of bumps 100 are provided as heat dissipating members for releasing heat from the movable member 32 to the fixed member 21.

The bumps 100 are provided in contact with the movable member 32 while being fixed to the fixed member 21. The bumps 100 are made of materials having higher thermal conductivity than air. The materials of the bumps 100 include, for example, at least one of Au, Ag, Cu, Ni, and solder. If the fixed member 21 includes a stiffener made of metals such as a stainless material, the bumps 100 may include protruding portions formed by working on the top surface of the fixed member 21. In other words, in the camera module 1 to which the technique of the present disclosure is applied, the heat dissipating members are assumed to be thermal conductors that are fixed to the second member (second substrate) and are disposed in contact with the first member (first substrate) in a gap between the first member (first substrate) and the second member (second substrate). In the camera module 1 to which the technique of the present disclosure is applied, the heat dissipating members are configured with bumps. The dissipating members may be configured with metallic or resin lumps or particulates that are sufficiently small relative to the fixed member 21 and the movable member 32.

Figure 4:
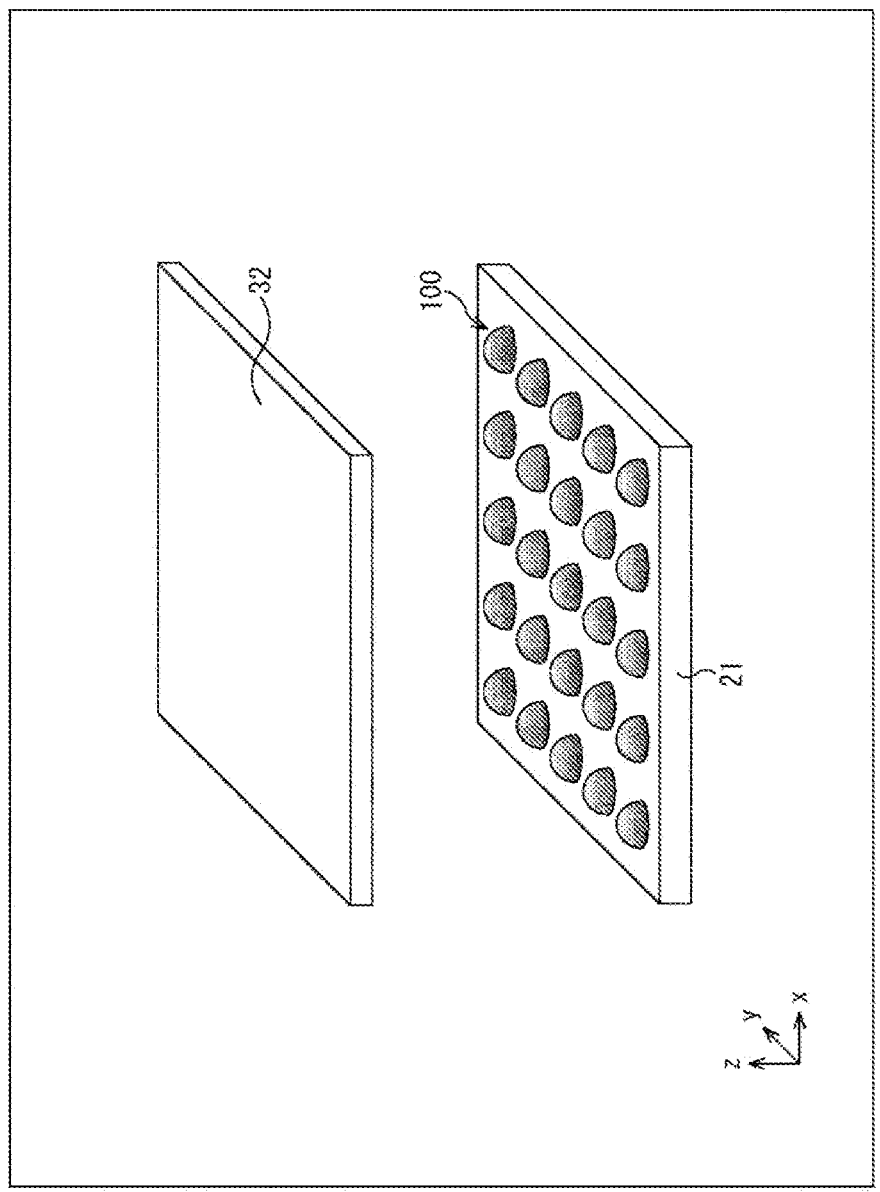
FIG. 4 is an explanatory drawing of the layout and shapes of bumps.

As illustrated in FIG. 4, for example, the 50 to 100 bumps 100 are disposed in a grid pattern on the top surface of the fixed member 21. The bumps 100 are hemispherical with the flat sides attached to the fixed member 21 and the spherical sides in point contact with the movable member 32. The bumps 100 are all identical in height. For example, the bumps 100 are 100 μm in height.

With this configuration, heat transmitted from the image sensor 31 to the movable member 32 can be transmitted to the fixed member 21 via the bumps 100, thereby improving heat dissipation.

Since the movable member 32 and the bumps 100 are in point contact with each other, friction can be suppressed between the movable member 32 and the bumps 100, thereby reducing an increase in the driving torque of the actuator mechanical part 40. The number of bumps 100 is preferably determined according to the requested effect of heat dissipation and an acceptable driving torque of the actuator mechanical part 40.

Second Example of the Heat Dissipation Structure

Figure 5:
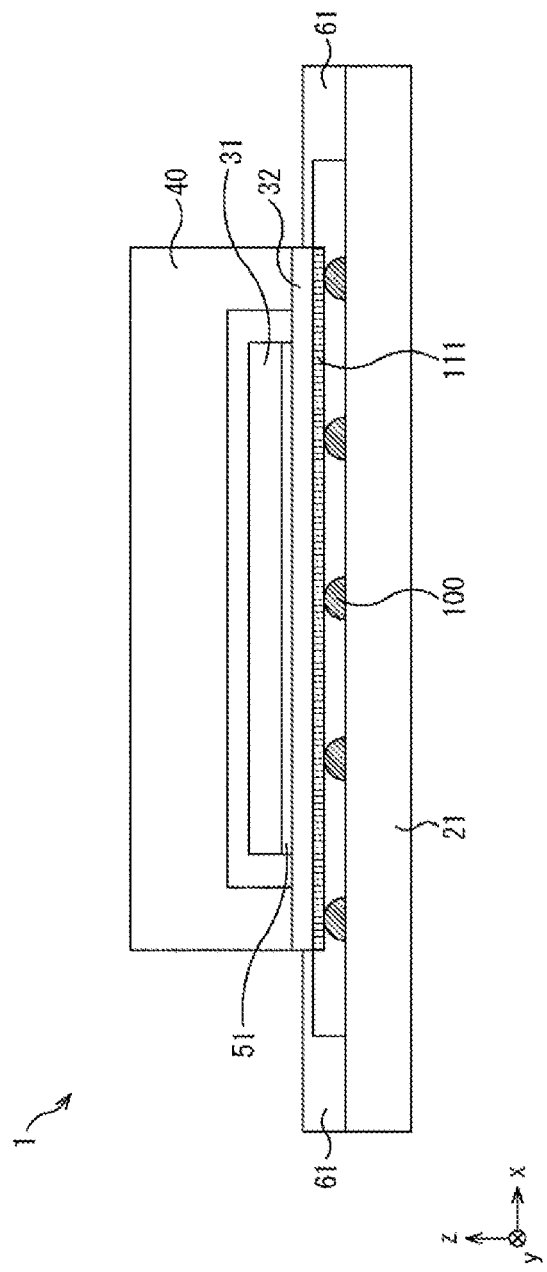
FIG. 5 is a cross-sectional view illustrating another configuration example of the camera module.

FIG. 5 illustrates another configuration example of the camera module 1 according to the present embodiment.

In the camera module 1 of FIG. 5, a heat dissipating material 111 having a thermal conducting property is provided on the back side of the movable member 32 in addition to the configuration of the camera module 1 in FIG. 3. The heat dissipating material 111 includes, for example, a heat dissipating sheet made of carbon graphite or Cu metal.

In the example of FIG. 5, the bumps 100 are provided in point contact with the heat dissipating material 111.

With this configuration, heat transmitted from the image sensor 31 to the movable member 32 can be efficiently transmitted to the fixed member 21 via the heat dissipating material 111 and the bumps 100, thereby improving heat dissipation.

Third Example of the Heat Dissipation Structure

Figure 6:
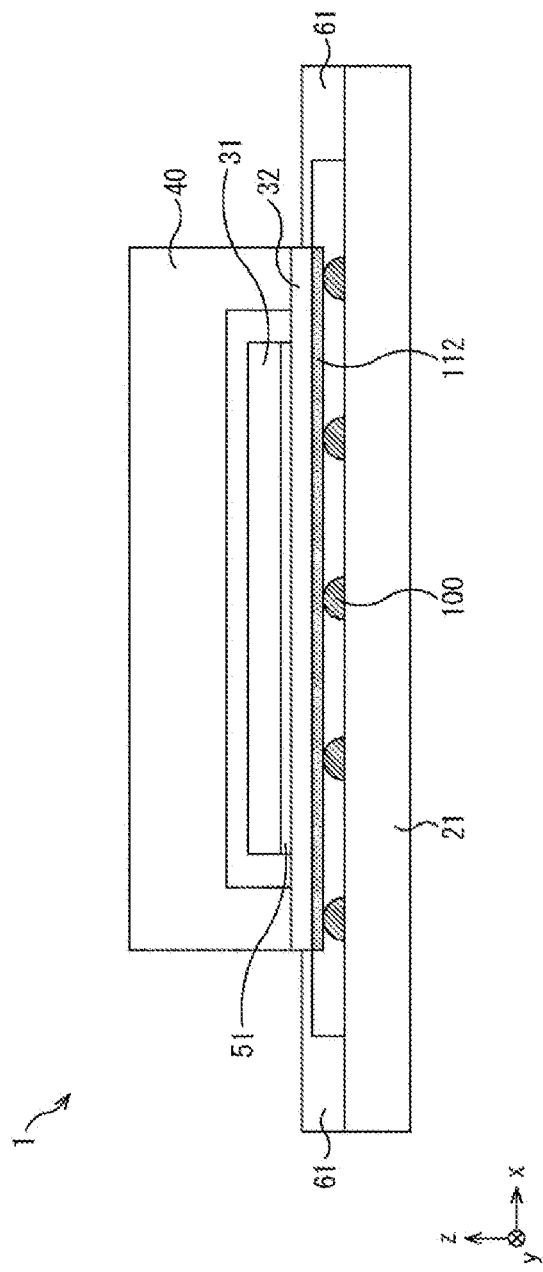
FIG. 6 is a cross-sectional view illustrating another configuration example of the camera module.

FIG. 6 illustrates another configuration example of the camera module 1 according to the present embodiment.

In the camera module 1 of FIG. 6, a low frictional material 112 having a low coefficient of friction is provided on the back side of the movable member 32 in addition to the configuration of the camera module 1 in FIG. 3. The low frictional material 112 includes a sheet of a material having low polarity (less adherent to other objects). The material having low polarity is, for example, PTFE (Poly Tetra Fluoro Ethylene) having a relatively rigid molecular structure surrounded by C-H having a small atomic radius, paraffin, high density polyethylene, or Bakelite (phenol resin). The material of the low frictional material 112 preferably has a thermal conducting property.

In the example of FIG. 6, the bumps 100 are provided in point contact with the low frictional material 112.

With this configuration, even if the number of bumps 100 is increased and larger friction is generated between the movable member 32 and the bumps 100, an increase in friction can be suppressed, thereby reducing an increase in the driving torque of the actuator mechanical part 40.

(Bump Shape)

Figure 7:
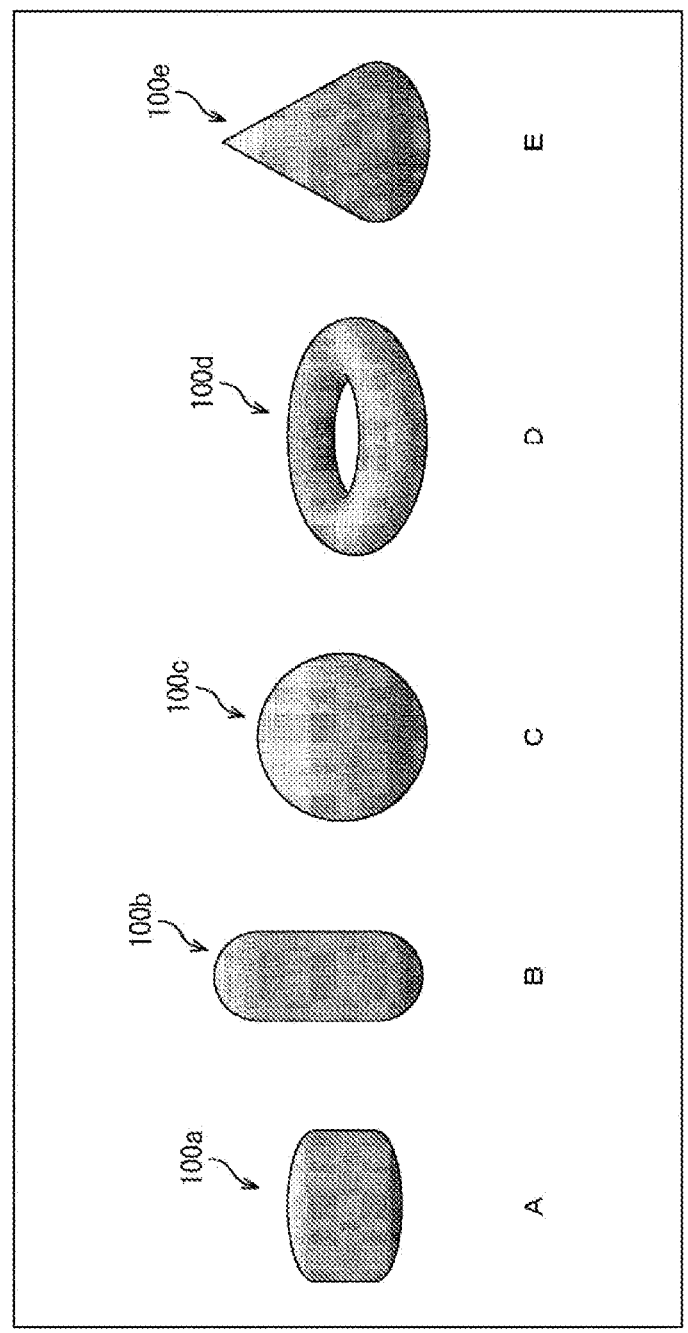
FIG. 7 illustrates examples of the shapes of the bumps.

FIG. 7 illustrates examples of the shapes of the bumps.

In the present embodiment, the bumps serving as heat dissipating members are hemispherical in shape. The shape is not limited to a hemisphere if the bumps are in point contact with the movable member 32 or quite small areas of the bumps are in contact with the movable member 32.

For example, the bumps in the present embodiment may be shaped like tablets, each having convex surfaces at the respective bottoms of a flat cylinder like a bump 100a in A of FIG. 7.

The bumps in the present embodiment may be shaped like capsules, each having hemispherical surfaces at the respective bottoms of a long cylinder like a bump 100b in B of FIG. 7.

The bumps in the present embodiment may be shaped like spheres like a bump 100c in C of FIG. 7.

The bumps in the present embodiment may be shaped like doughnuts, that is, tori like a bump 100d in D of FIG. 7.

The bumps in the present embodiment may be shaped like cones like a bump 100e in E of FIG. 7. The bump 100e may have a convex surface at the vertex of the cone. The bump 100e may have a concave at the center of the cut surface of a vertex portion of the cone and the circular section may be chamfered into a curved surface.

If bumps particularly like the bumps 100a, 100b, and 100c are fixed to the fixed member 21, the bumps are not flat on the fixed member 21 and thus are hard to attach to the fixed member 21.

Figure 8:
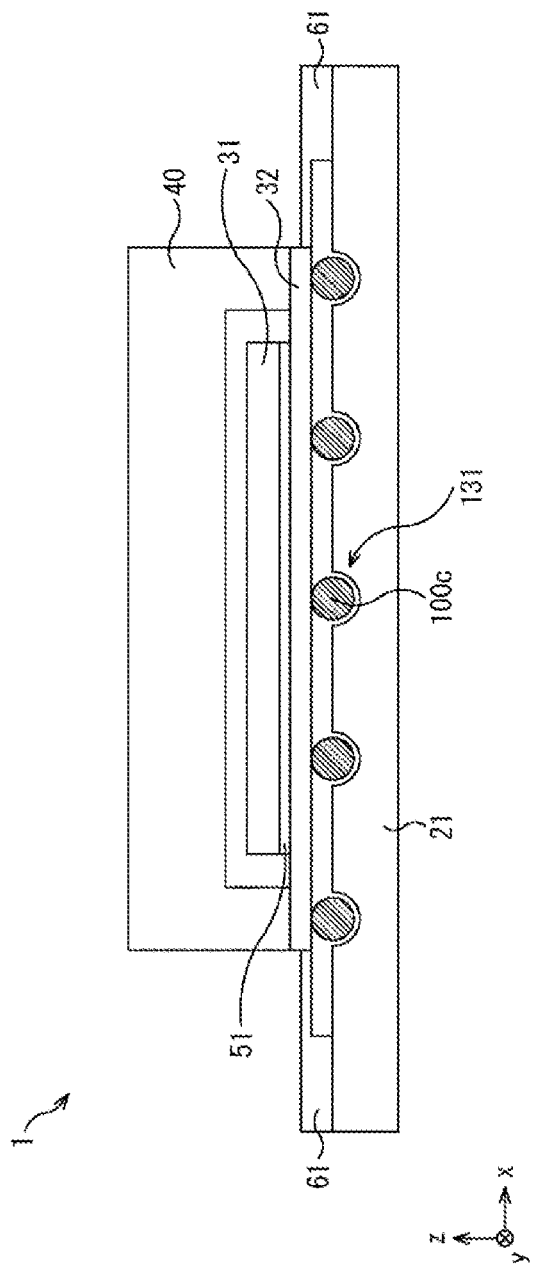
FIG. 8 is a cross-sectional view illustrating another configuration example of the camera module.

Thus, for example, if the spherical bumps 100c are fixed to the fixed member 21, the bumps 100c are fit into grooves 131 that are hemispherical on the fixed member 21 as illustrated in FIG. 8. With this structure, bumps like the bumps 100a, 100b, and 100c that are not flat on the fixed member 21 can be fixed to the fixed member 21 without being displaced or dropped.

In the configuration of FIG. 8, in particular, the grooves 131 increase contact surfaces between the fixed member 21 and the bumps 100, so that heat transmitted from the image sensor 31 to the movable member 32 can be efficiently transmitted to the fixed member 21 via the bumps 100c. Moreover, the rotations of the bumps 100c in the grooves 131 can more smoothly move the movable member 32.

(Layout of Bumps)

Figure 9:
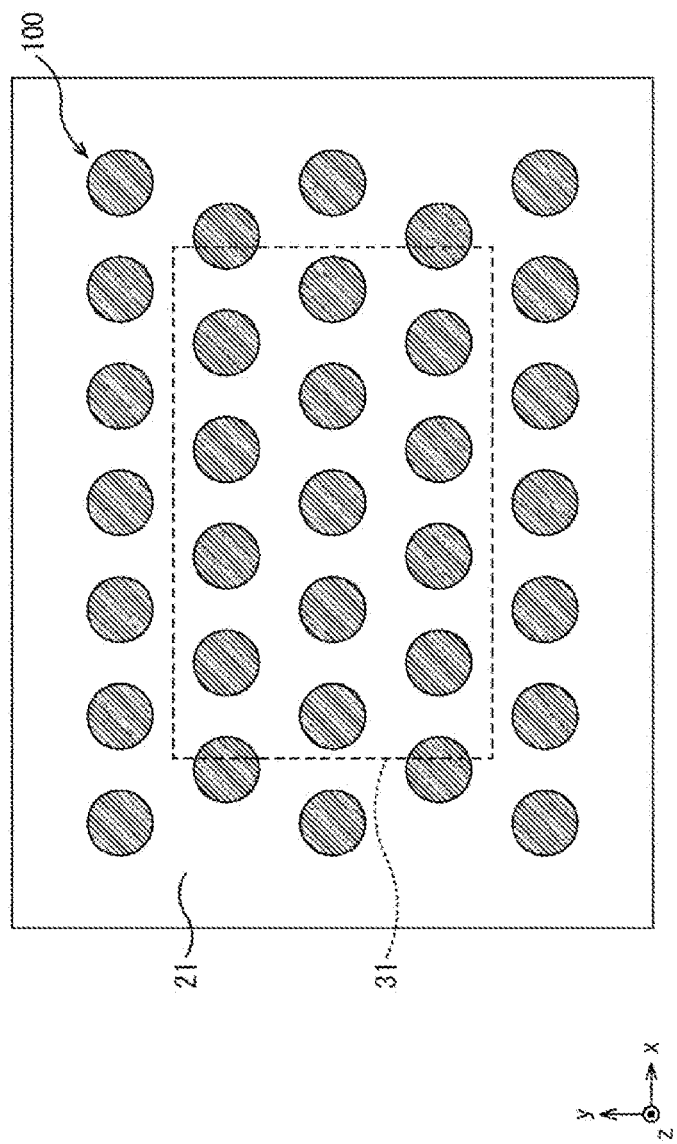
FIG. 9 illustrates an example of the layout of the bumps.
Figure 10:
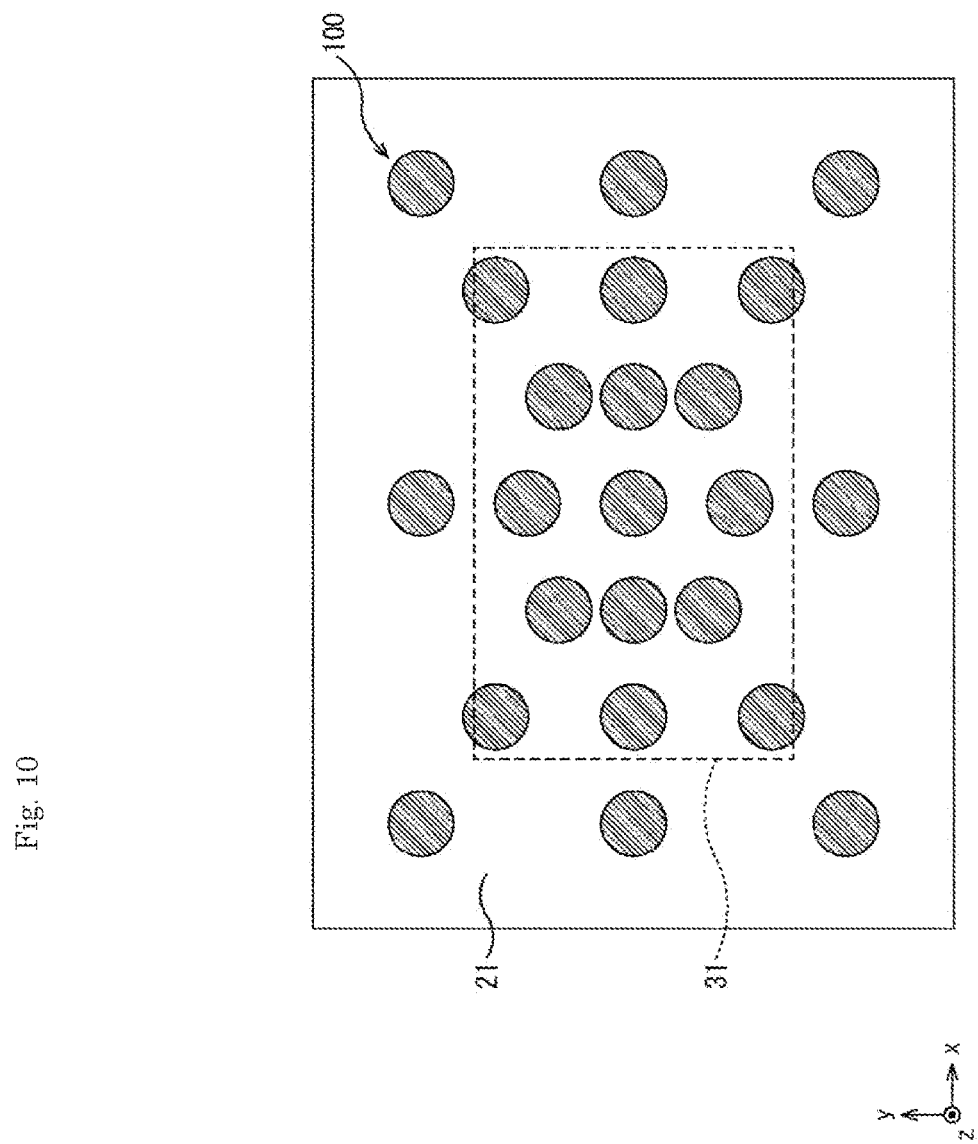
FIG. 10 illustrates an example of the layout of the bumps.
Figure 11:
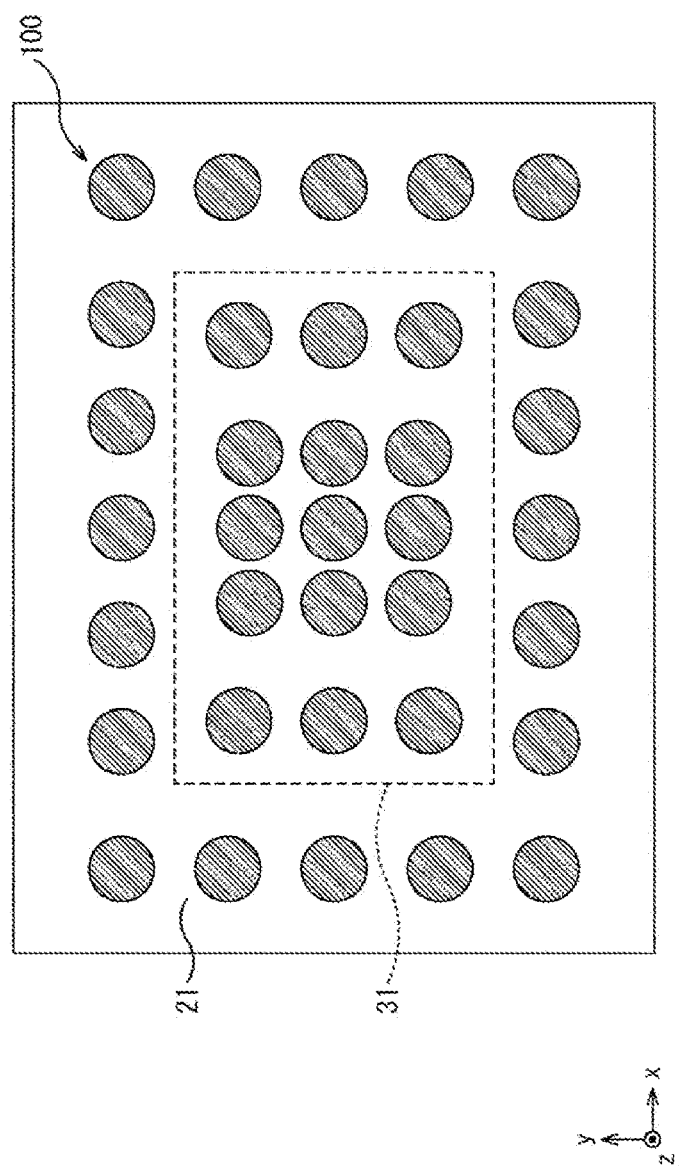
FIG. 11 illustrates an example of the layout of the bumps.

FIGS. 9 to 11 illustrate examples of the layout of the bumps.

In the foregoing embodiment, the bumps serving as heat dissipating members are disposed in a grid pattern on the top surface of the fixed member 21. The layout of the bumps is not limited to the grid pattern.

For example, as illustrated in FIG. 9, the bumps 100 in the present embodiment may be disposed in a staggered pattern on the top surface of the fixed member 21. FIGS. 9 to 11 illustrate the top views of the fixed member 21 on the xy plane viewed from the front and illustrate rectangles indicating the image sensor 31 by broken lines.

As illustrated in FIG. 10, the bumps 100 in the present embodiment may be radially disposed with respect to the center of the image sensor 31 on the top surface of the fixed member 21. In this case, the number of bumps 100 disposed immediately under the image sensor 31 increases, thereby improving the efficiency of heat dissipation through the bumps 100.

Alternatively, the bumps may be radially disposed with respect to the center of the movable member 32 on the top surface of the fixed member 21. In this case, the movable member 32 can stay balanced while moving.

As illustrated in FIG. 11, the bumps 100 in the present embodiment may be densely disposed near the center of the image sensor 31 on the top surface of the fixed member 21. Also in this case, the number of bumps 100 disposed immediately under the image sensor 31 increases, thereby improving the efficiency of heat dissipation through the bumps 100.

Figure 12:
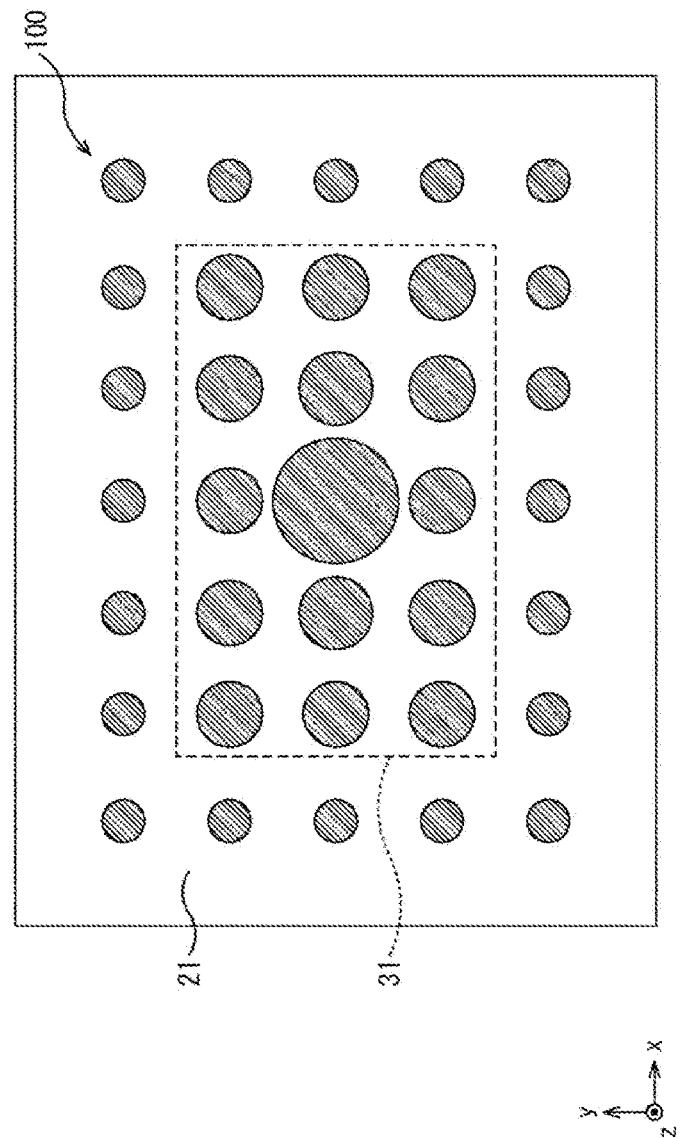
FIG. 12 illustrates an example of a bump size.

The number of bumps 100 disposed immediately under the image sensor 31 is increased as illustrated in FIGS. 10 and 11. Alternatively, the bumps 100 disposed immediately under the image sensor 31 may be increased in size. Specifically, as illustrated in FIG. 12, the bumps 100 may be increased in size toward the center of the image sensor 31. In this case, the bumps 100 disposed immediately under the image sensor 31 increases in volume, thereby improving the efficiency of heat dissipation through the bumps 100.

The bumps 100 are all identical in height. This does not indicate that only some of the bumps 100 are in contact with the movable member 32. Since all the bumps 100 are in uniform contact with the movable member 32, heat can be more efficiently dissipated.

3. Second Embodiment

Figure 13:
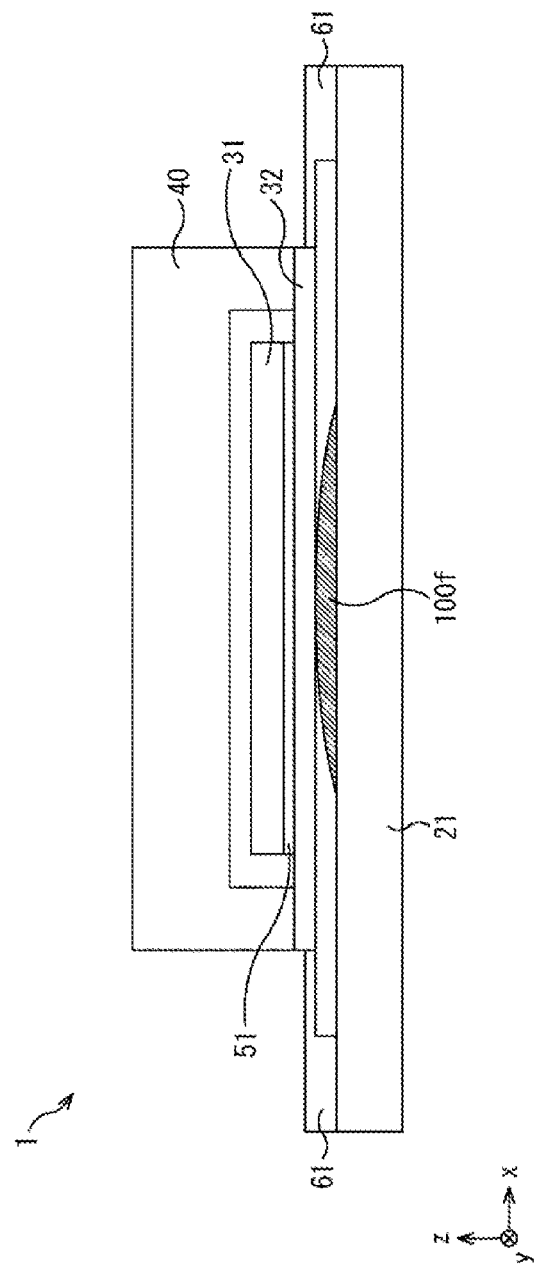
FIG. 13 is a cross-sectional view illustrating another configuration example of the camera module.

FIG. 13 is a cross-sectional view illustrating a configuration example of a camera module 1 according to a second embodiment.

In the camera module 1 of FIG. 13, the bumps 100 in the configuration of the camera module 1 in FIG. 3 are replaced with a single bump 100f serving as a heat dissipating member in a gap between a fixed member 21 and a movable member 32.

The bump 100f has a curved surface with a larger radius of curvature than the bump 100 and is in surface contact with the movable member 32, the surface contact being larger than the point contact.

In the example of FIG. 13, the heat dissipating material 111 described with reference to FIG. 5 or the low frictional material 112 described with reference to FIG. 6 may be provided on the back side of the movable member 32.

With this configuration, heat transmitted from an image sensor 31 to the movable member 32 can be transmitted to the fixed member 21 via the bump 100f, thereby improving heat dissipation.

4. Third Embodiment

Figure 14:
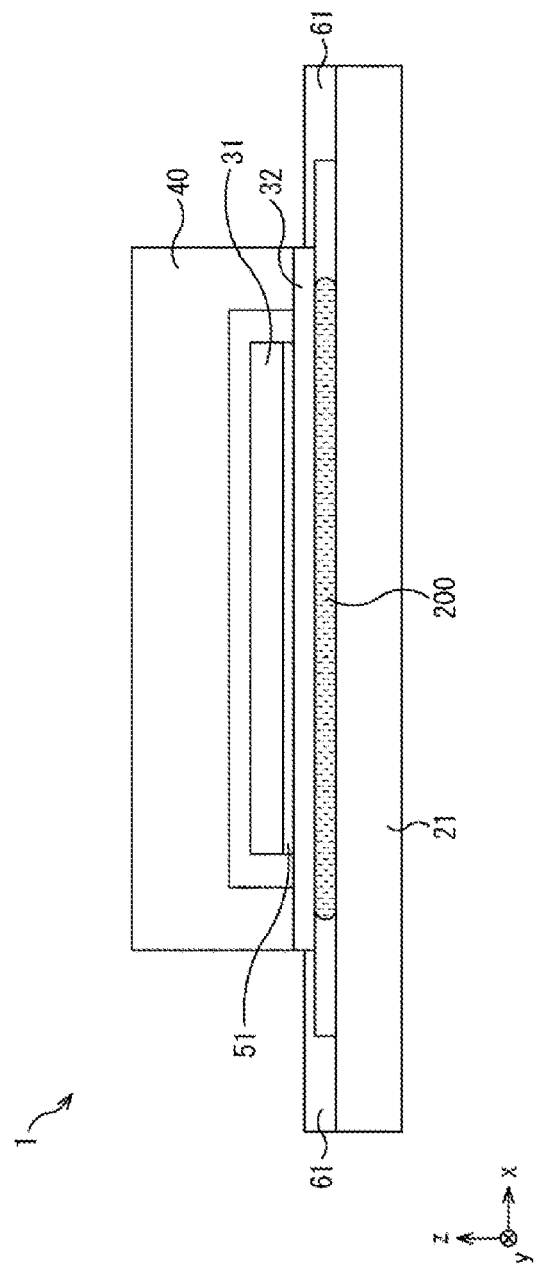
FIG. 14 is a cross-sectional view illustrating a configuration example of a camera module according to a second embodiment.

FIG. 14 is a cross-sectional view illustrating a configuration example of a camera module 1 according to a third embodiment.

In the camera module 1 of FIG. 13, the bumps 100 in the configuration of the camera module 1 in FIG. 3 are replaced with a gel material 200 having a thermal conducting property charged or applied in a gap between a fixed member 21 and a movable member 32.

The gel material 200 may be a magnetic filler containing magnetic fluid or a carbon filler.

With this configuration, heat transmitted from an image sensor 31 to the movable member 32 can be transmitted to the fixed member 21 via the gel material 200, thereby improving heat dissipation.

5. Fourth Embodiment

First Example of a Heat Dissipation Structure

Figure 15:
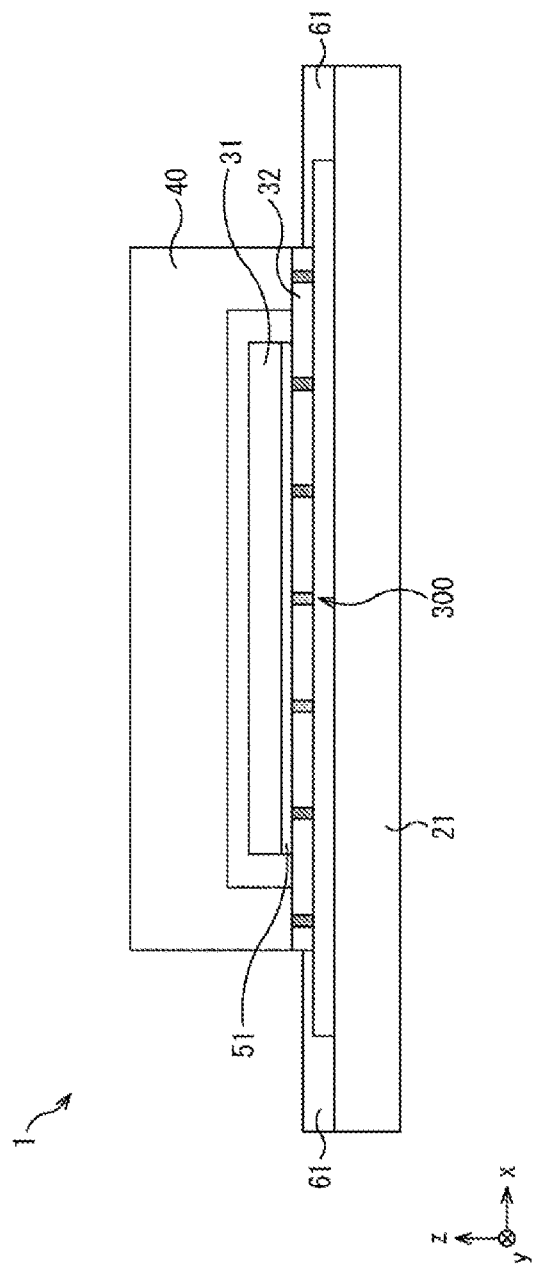
FIG. 15 is a cross-sectional view illustrating a configuration example of a camera module according to a third embodiment.

FIG. 15 is a cross-sectional view illustrating a configuration example of a camera module 1 according to a fourth embodiment.

In the camera module 1 of FIG. 15, unlike the camera module 1 according to the foregoing embodiments, heat dissipating members such as bumps 100 are absent in a gap between a fixed member 21 and a movable member 32.

Instead of heat dissipating members, a plurality of vias 300 are formed by penetrating from the front side to the back side of the movable member 32 in the camera module 1 of FIG. 15. The vias 300 are supposed to be formed over the movable member 32, but the vias 300 only need to be formed at least in the installation part of an image sensor 31 on the movable member 32. Metals for forming the vias 300 include, for example, at least one of Au, Ag, Cu, Ni, and solder.

With this configuration, heat transmitted from the image sensor 31 to the movable member 32 can be efficiently released to a gap between the fixed member 21 and the movable member 32 via the vias 300, thereby improving heat dissipation.

By increasing, in particular, the number of vias 300 formed immediately under the image sensor 31 on the movable member 32, heat can be dissipated through the vias 300 with higher efficiency.

Second Example of the Heat Dissipation Structure

Figure 16:
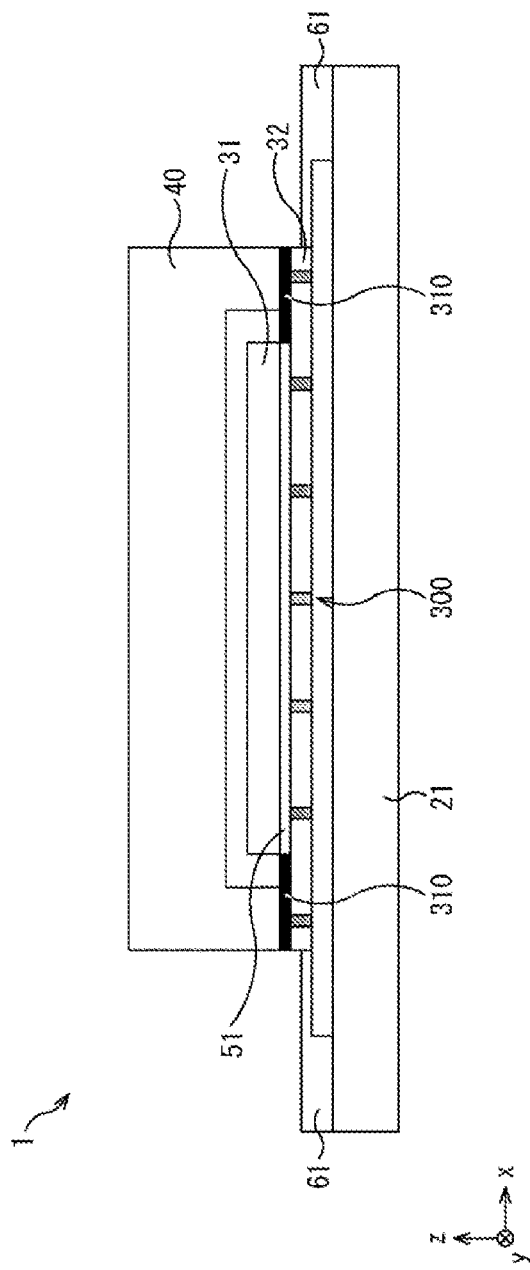
FIG. 16 is a cross-sectional view illustrating another configuration example of the camera module.

FIG. 16 illustrates another configuration example of the camera module 1 according to the present embodiment.

In the camera module 1 of FIG. 16, a heat dissipating layer 310 having a thermal conducting property is provided on the front side of the movable member 32 in addition to the configuration of the camera module 1 in FIG. 15. Specifically, the heat dissipating layer 310 is formed around the image sensor 31 on the front side of the movable member 32. The heat dissipating layer 310 includes, for example, copper foil. The heat dissipating layer 310 may include a metallic thin film that is formed with high thermal conductivity by plating or vapor deposition.

With this configuration, heat transmitted from the image sensor 31 to the movable member 32 can be transmitted to an actuator mechanical part 40 and a cabinet 11 via the heat dissipating layer 310, thereby improving heat dissipation.

Third Example of the Heat Dissipation Structure

Figure 17:
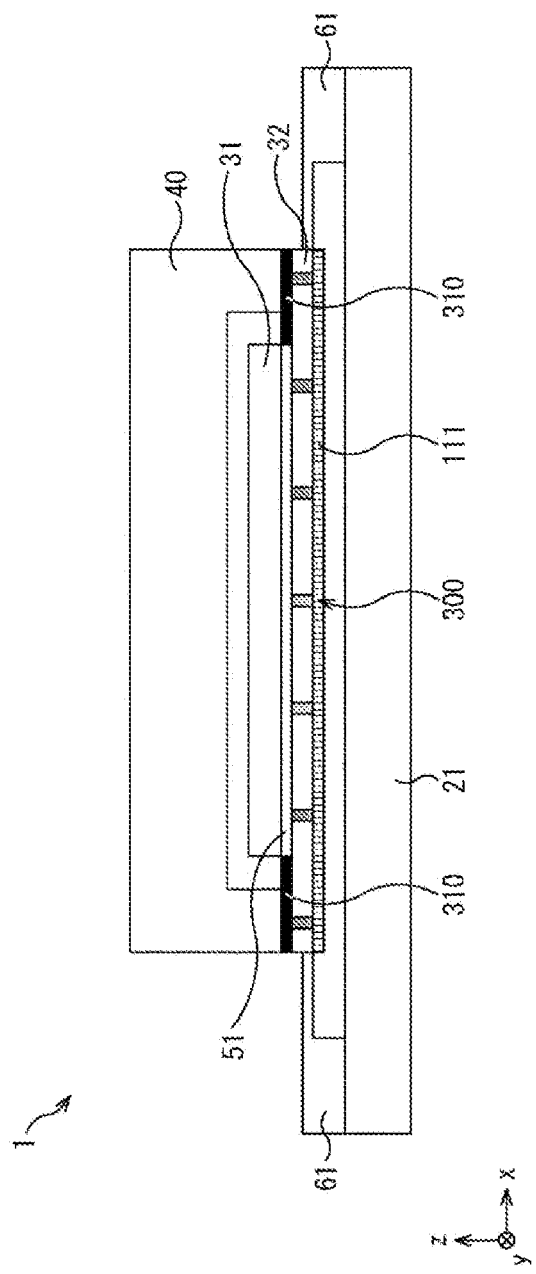
FIG. 17 is a cross-sectional view illustrating another configuration example of the camera module.

FIG. 17 illustrates another configuration example of the camera module 1 according to the present embodiment.

In the camera module 1 of FIG. 17, the heat dissipating material 111 described with reference to FIG. 5 is provided on the back side of the movable member 32 in addition to the configuration of the camera module 1 in FIG. 16. In the example of FIG. 17, the heat dissipating layer 310 may be omitted.

With this configuration, heat transmitted from the image sensor 31 to the movable member 32 can be efficiently released to a gap between the fixed member 21 and the movable member 32 via the vias 300 and the heat dissipating material 111, thereby improving heat dissipation.

In the example of FIG. 17, the heat dissipating material 111 and the vias 300 may be integrally formed. Furthermore, if the heat dissipating layer 310 is formed instead of a chip fixing material 51 between the image sensor 31 and the movable member 32, the vias 300 and the heat dissipating layer 310 may be integrally formed or the heat dissipating material 111, the vias 300, and the heat dissipating layer 310 may be integrally formed.

Fourth Example of the Heat Dissipation Structure

Figure 18:
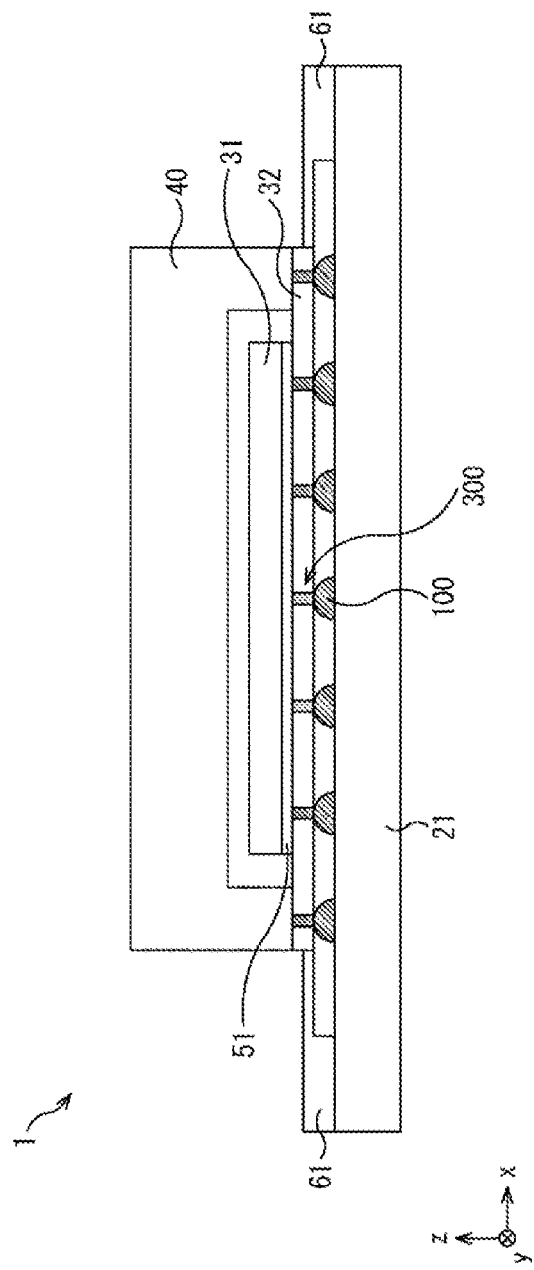
FIG. 18 is a cross-sectional view illustrating another configuration example of the camera module.

FIG. 18 illustrates another configuration example of the camera module 1 according to the present embodiment.

In the camera module 1 of FIG. 18, the bumps 100 described with reference to, for example, FIG. 3 are provided in a gap between the fixed member 21 and the movable member 32 in addition to the configuration of the camera module 1 in FIG. 15. The bumps 100 are disposed at the respective positions corresponding to the vias 300 formed by penetrating from the front side to the back side of the movable member 32.

In the camera module 1 of FIG. 18, the bumps 100 fixed to the fixed member 21 are provided in contact with the vias 300 formed on the movable member 32.

With this configuration, heat transmitted from the image sensor 31 to the movable member 32 can be efficiently transmitted to the fixed member 21 via the vias 300 and the bumps 100, thereby improving heat dissipation.

The vias 300 in the camera module 1 of the present embodiment can be disposed in any one of the bump layouts of the camera module 1 according to the first embodiment.

6. Fifth Embodiment

Figure 19:
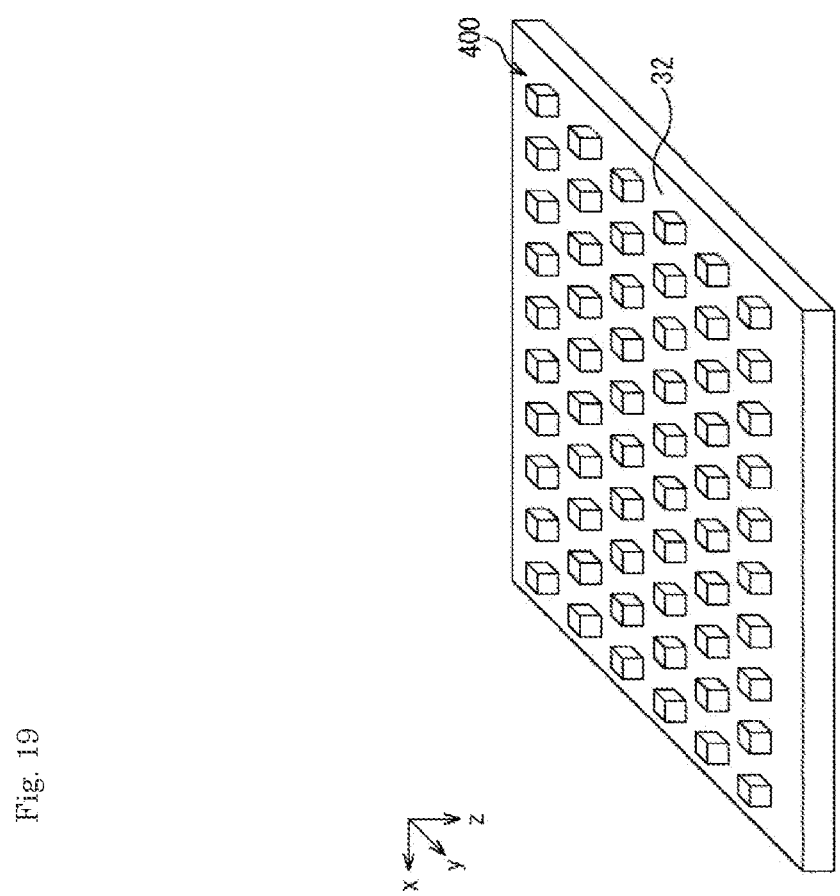
FIG. 19 illustrates a configuration example of a movable member according to a fourth embodiment.

FIG. 19 illustrates a configuration example of a movable member 32 constituting a camera module 1 according to a fifth embodiment.

FIG. 19 illustrates the back side of the movable member 32 (a surface near a fixed member 21). On the back side of the movable member 32, a plurality of radiator fins 400 are provided. In the example of FIG. 19, the radiator fins 400 have structures protruding like rectangular solids (specifically, cubes).

With this configuration, the movable member 32 having a large surface area on the back side can efficiently release heat transmitted from an image sensor 31 to the movable member 32, thereby improving heat dissipation.

The radiator fins 400 may have, for example, fin-shaped structures in addition to the protruding structures in FIG. 19.

7. Sixth Embodiment

In the camera module 1 of the sensor-shift system, the effect of heat dissipation can be improved by reducing an air gap under the movable member 32 on which the image sensor 31 is mounted.

Figure 20:
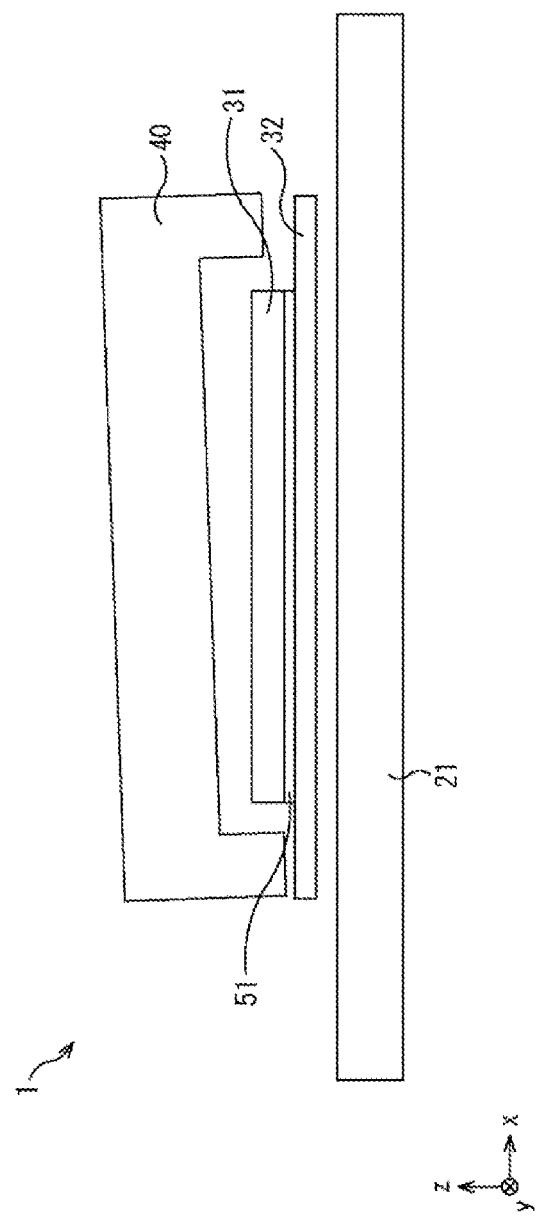
FIG. 20 is an explanatory drawing of tilting of the movable member.

As illustrated in FIG. 20, because of nonuniformity in the manufacturing of the camera module 1, the actuator mechanical part 40 may be tilted and bonded onto the movable member 32 on which the image sensor 31 is mounted.

Figure 21:
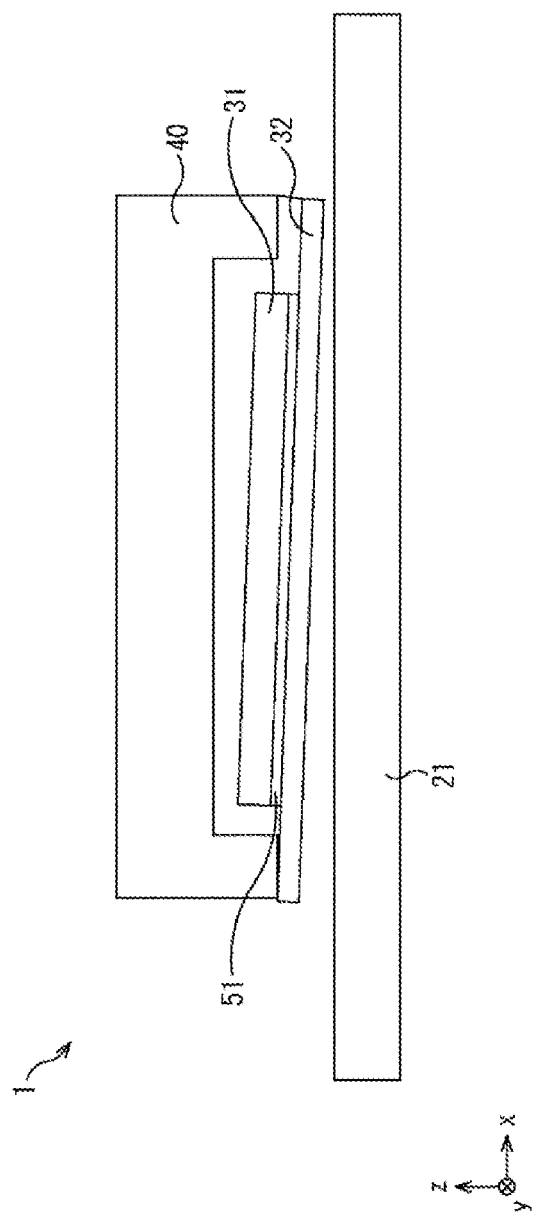
FIG. 21 is an explanatory drawing of tilting of the movable member.

In this case, in the finally manufactured camera module 1, the movable member 32 is tilted relative to the fixed member 21 as illustrated in FIG. 21. Furthermore, the movable member 32 may be tilted relative to the fixed member 21 during a sensor shift of the camera module 1.

To address the problem, an air gap with a certain width needs to be obtained under the movable member 32. Specifically, a small displacement around the center of the movable member 32 is increased toward the outer edge of the movable member 32 by tilting. Thus, an air gap needs to be obtained so as to prevent the outer edge of the movable member 32 from coming into contact with the fixed member 21 when the movable member 32 has the maximum amount of tilting. This results in difficulty in improving the effect of heat dissipation by reducing an air gap.

Figure 22:
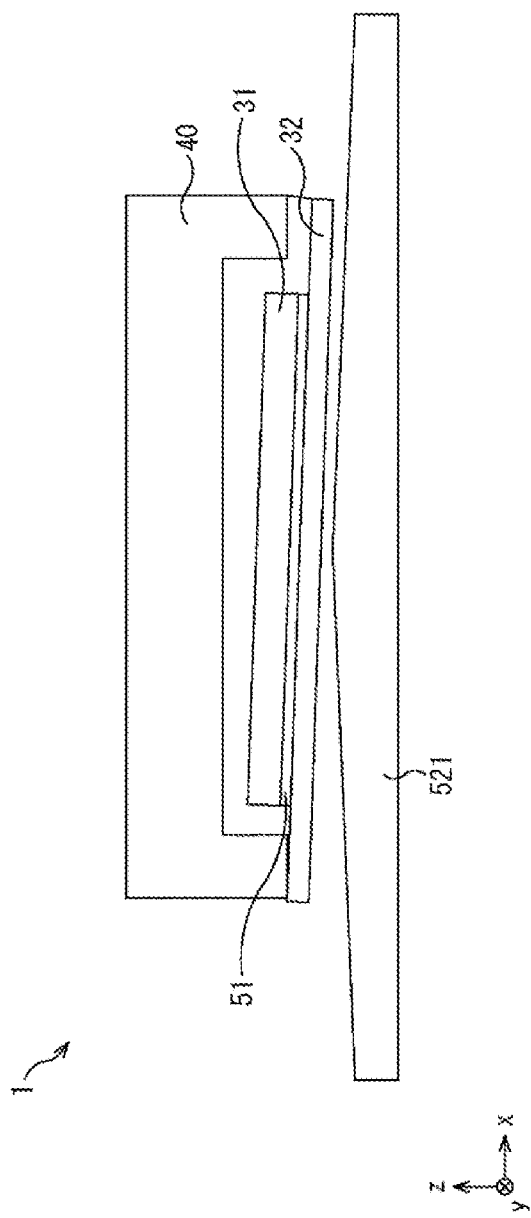
FIG. 22 is a cross-sectional view illustrating a configuration example of a camera module according to a fifth embodiment.

FIG. 22 is a cross-sectional view illustrating a configuration example of a camera module 1 according to a fifth embodiment.

Also in the camera module 1 of FIG. 22, a movable member 32 is tilted relative to a fixed member 21. In the camera module 1 of FIG. 22, a fixed member 521 is provided instead of the fixed member 21 in the configuration of the camera module 1 of, for example, FIG. 3.

The fixed member 521 is basically configured like the fixed member 21 but has a tilted surface (a surface near the movable member 32) that faces the movable member 32 such that a distance from the movable member 32 increases toward the outer edge. In other words, the fixed member 521 has the surface facing the movable member 32 such that the surface is formed as a pyramidal surface having the vertex substantially at the center. The fixed member 521 has the surface facing the movable member 32 at a tilt angle that is determined according to the maximum amount of tilting of the movable member 32.

With this configuration, a minimum distance can be obtained such that the outer edge of the movable member 32 is not in contact with the fixed member 21 when the movable member 32 has the maximum amount of tilting. This can reduce a gap (air gap) between the fixed member 21 and the movable member 32, thereby improving the effect of heat dissipation.

8. Modification Example

A modification of the camera module 1 including the bumps in a gap between the fixed member 21 and the movable member 32 will be described below.

First Modification

Figure 23:
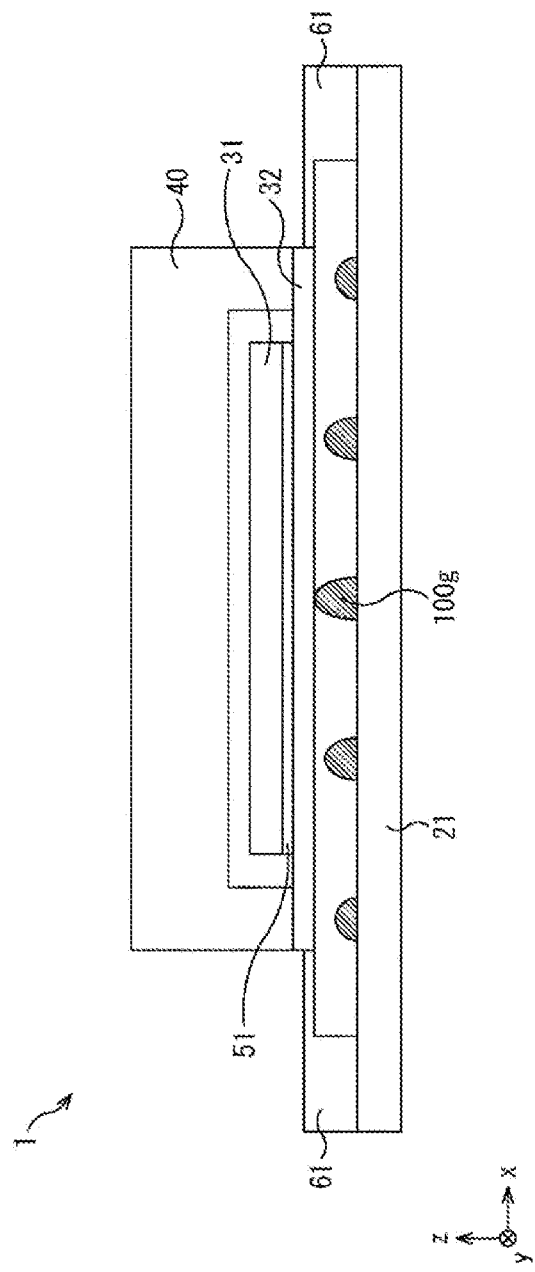
FIG. 23 illustrates a first modification of the camera module including bumps.

FIG. 23 is a cross-sectional view illustrating a first modification of the camera module 1 including the bumps.

In the camera module 1 of FIG. 23, the bumps 100 in the configuration of the camera module 1 in FIG. 3 are replaced with a plurality of bumps 100g in a gap between the fixed member 21 and the movable member 32.

The bumps 100g are formed so as to increase in height toward the center of the movable member 32 (decrease in height toward the outer edge of the movable member 32). In the example of FIG. 23, the bumps 100g are fixed to the fixed member 21 while only the bump 100g near the center of the movable member 32 is in contact with the movable member 32.

A change of the height of the bumps 100g from the center of the movable member 32 is determined according to the maximum amount of tilting of the movable member 32 like the fixed member 521 in the example of FIG. 22. In other words, the bumps 100g are provided such that the bump 100g farthest from the center of the movable member 32 is in contact with the outer edge of the movable member 32 when the movable member 32 has the maximum amount of tilting.

With this configuration, heat dissipation can be improved while eliminating a load to the outer edge of the movable member 32 when the movable member 32 has the maximum amount of tilting.

Second Modification

In the foregoing description, the bumps provided in a gap between the fixed member 21 and the movable member 32 are fixed to the fixed member 21. The bumps may be fixed to any one of the fixed member 21 and the movable member 32 and disposed in contact with the other. In other words, the heat dissipating members in the camera module 1 to which the technique of the present disclosure may be fixed to any one of the first member (first substrate) and the second member (second substrate) and disposed in contact with the other.

Figure 24:
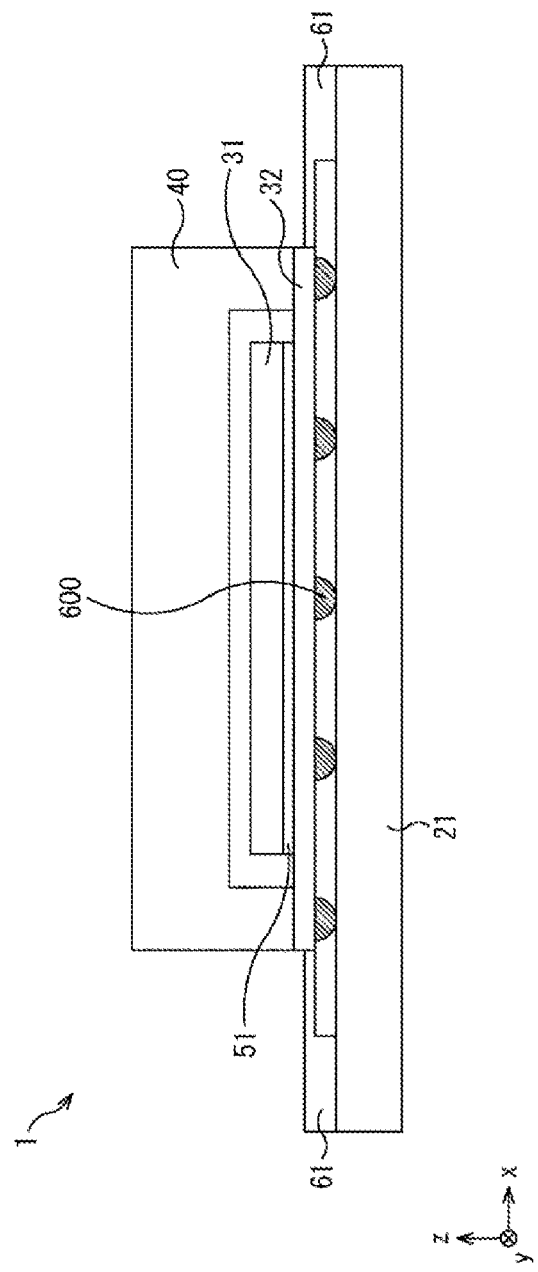
FIG. 24 illustrates a second modification of the camera module including bumps.

FIG. 24 is a cross-sectional view illustrating a second modification of the camera module 1 including the bumps.

In the camera module 1 of FIG. 24, the bumps 100 in the configuration of the camera module 1 in FIG. 3 are replaced with a plurality of bumps 600 in a gap between the fixed member 21 and the movable member 32.

The bumps 600 fixed to the movable member 32 are provided in point contact with the fixed member 21.

With this configuration, heat transmitted from the image sensor 31 to the movable member 32 can be transmitted to the fixed member 21 via the bumps 600, thereby improving heat dissipation.

Since the fixed member 21 and the bumps 600 are in point contact with each other, friction can be suppressed between the fixed member 21 and the bumps 600, thereby reducing an increase in the driving torque of the actuator mechanical part 40.

Figure 25:
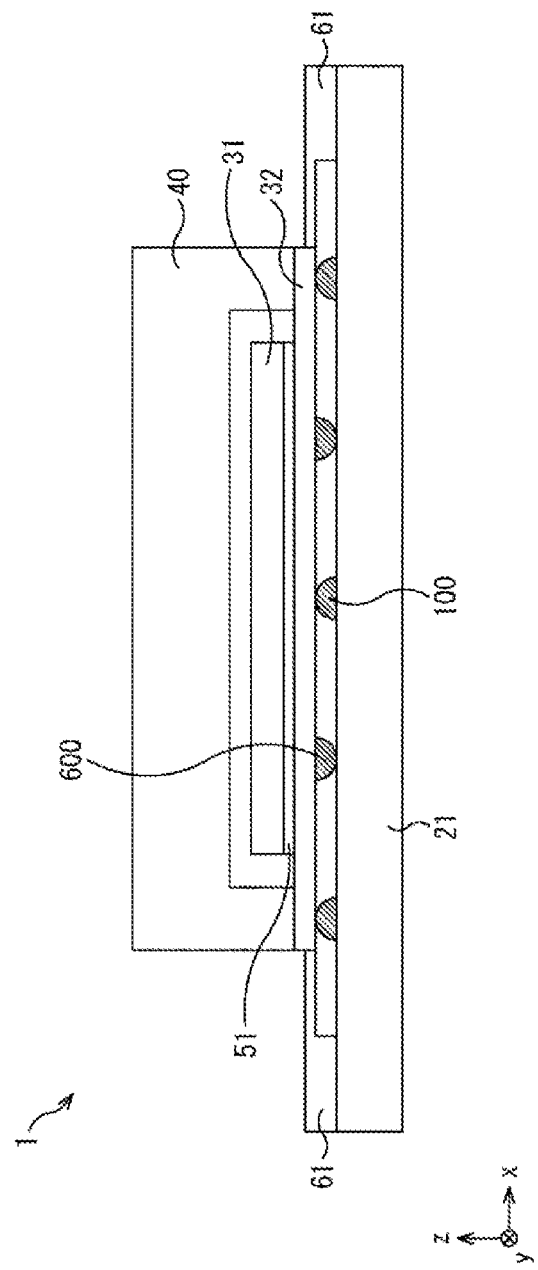
FIG. 25 illustrates a third modification of the camera module including bumps.

(Third modification) FIG. 25 is a cross-sectional view illustrating a third modification of the camera module 1 including the bumps.

In the camera module 1 of FIG. 25, the bumps 100 in the configuration of the camera module 1 in FIG. 3 and the bumps 600 in the configuration of the camera module 1 in FIG. 24 are mixed in a gap between the fixed member 21 and the movable member 32.

With this configuration, heat transmitted from the image sensor 31 to the movable member 32 can be transmitted to the fixed member 21 via the bumps 100 and the bumps 600, thereby improving heat dissipation.

Since the contact between the movable member 32 and the bumps 100 and the contact between the fixed member 21 and the bumps 600 are point contact, friction can be suppressed between the movable member 32 and the bumps 100 and between the fixed member 21 and the bumps 600, thereby reducing an increase in the driving torque of the actuator mechanical part 40.

The materials, shapes, and layouts of the bumps (bumps 100g, 600, 100) in the modifications may be adopted from any of the materials, shapes, and layouts of the bumps of camera module 1 according to the first embodiment.

9. Configuration of Electronic Device

Figure 26:
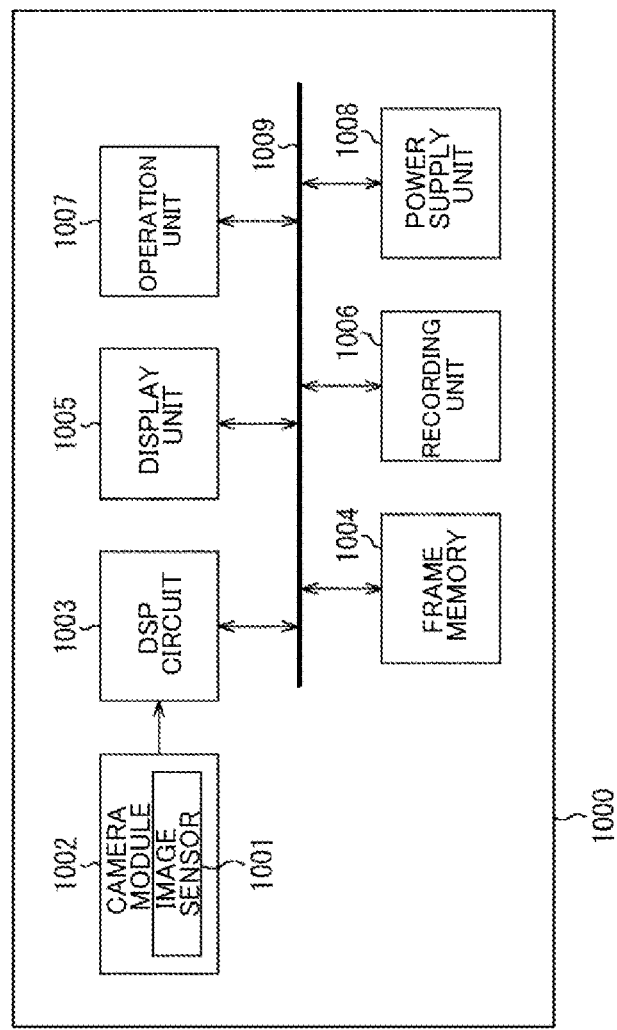
FIG. 26 is a block diagram illustrating a configuration example of an electronic device to which the technique of the present disclosure is applied.

FIG. 26 is a block diagram illustrating a configuration example of the electronic device to which the technique of the present disclosure is applied.

An electronic device 1000 in FIG. 26 includes a camera module 1002 and a DSP (Digital Signal Processor) circuit 1003 serving as an image signal processing circuit. The electronic device 1000 further includes a frame memory 1004, a display unit 1005, a recording unit 1006, an operation unit 1007, and a power supply unit 1008. The DSP circuit 1003, the frame memory 1004, the display unit 1005, the recording unit 1006, the operation unit 1007, and the power supply unit 1008 are connected to one another via a bus line 1009.

An image sensor 1001 in the camera module 1002 takes in incident light (image light) from a subject, converts the light amount of the incident light, which forms an image on an imaging surface, into an electrical signal for each pixel, and outputs the signal as a pixel signal. The camera module 1 is used as the camera module 1002, and the image sensor 1001 corresponds to the image sensor 31.

The display unit 1005 is configured with a panel-type display device, e.g., a liquid crystal panel or an organic EL (Electro Luminescence) panel, and displays a moving image or a still image captured by the image sensor 1001. The recording unit 1006 records the moving image or the still image captured by the image sensor 1001 in a recording medium, e.g., a hard disk or a semiconductor memory.

The operation unit 1007 issues operation commands for various functions of the electronic device 1000 in response to user operations. The power supply unit 1008 properly supplies various power supplies to the DSP circuit 1003, the frame memory 1004, the display unit 1005, the recording unit 1006, and the operation unit 1007 as operation power supplies.

As described above, the camera module 1 used as the camera module 1002 can improve heat dissipation. Thus, heat dissipation can be also improved in the electronic device 1000, for example, a smartphone, a tablet, or a portable PC.

The advantageous effects described in the present specification are merely exemplary and are not limited, and other advantageous effects may be obtained.

Embodiments to which the technique of the present disclosure is applied are not limited to the foregoing embodiments, and various modifications can be made without departing from the gist of the technique of the present disclosure.

The present disclosure can be configured as follows:
(1) A camera module including:
an image sensor;
a movable member that has the image sensor on the front side and is movable in a direction along the imaging surface of the image sensor;

a fixed member that is fixed with a predetermined gap interposed between the fixed member and the back side of the movable member; and at least one heat dissipating member that is fixed to at least one of the fixed member and the movable member and is in contact with the other in the gap.

(2)
The camera module according to (1), wherein the at least one heat dissipating member includes a bump.

(3)
The camera module according to (2), wherein the bump is made of a material having higher thermal conductivity than air.

(4)
The camera module according to (3), wherein the bump is made of a material containing at least one of Au, Ag, Cu, Ni, and solder or includes a protruding portion formed by working on the top surface of the fixed member.

(5)
The camera module according to any one of (1) to (4), wherein the at least one heat dissipating member is fixed to the fixed member and is provided in point contact with the movable member.

(6)
The camera module according to (5), further including a heat dissipating material having a thermal conducting property and provided on the back side of the movable member,
wherein the at least one heat dissipating member is provided in point contact with the heat dissipating material.

(7)
The camera module according to (5), further including a low frictional material on the back side of the movable member,
wherein the at least one heat dissipating member is provided in point contact with the low frictional material.

(8)
The camera module according to any one of (5) to (7), wherein the at least one heat dissipating member is attached to the fixed member.

(9)
The camera module according to any one of (5) to (7), wherein the at least one heat dissipating member is spherical and is fit into a groove formed on the fixed member.

(10)
The camera module according to any one of (1) to (9), wherein the at least one heat dissipating member includes a plurality of heat dissipating members disposed in a grid pattern.

(11)
The camera module according to any one of (1) to (9), wherein the at least one heat dissipating member includes a plurality of heat dissipating members disposed in a staggered pattern.

(12)
The camera module according to any one of (1) to (9), wherein the at least one heat dissipating member includes a plurality of heat dissipating members that are radially disposed with respect to the center of the image sensor.

(13)
The camera module according to any one of (1) to (9), wherein the at least one heat dissipating member includes a plurality of heat dissipating members that are more densely disposed closer to the center of the image sensor.

(14)
The camera module according to any one of (1) to (9), wherein the at least one heat dissipating member includes a plurality of heat dissipating members that are larger in size closer to the center of the image sensor.

(15)
The camera module according to any one of (1) to (14), further including a plurality of vias that are formed by penetrating from the front side to the back side of the movable member,
wherein the at least one heat dissipating member includes a plurality of heat dissipating members that are disposed at respective positions corresponding to the plurality of vias.

(16)
The camera module according to (15), wherein the vias are formed in an installation part of the image sensor on the movable member.

(17)
The camera module according to any one of (1) to (4) and (10) to (16), wherein the at least one heat dissipating member is fixed to the movable member and is provided in point contact with the fixed member.

(18)
The camera module according to any one of (1) to (4) and (10) to (16), further including, as the at least one heat dissipating member, a first heat dissipating member that is fixed to the fixed member and is provided in point contact with the movable member and a second heat dissipating member that is fixed to the movable member and is provided in point contact with the fixed member.

(19)
The camera module according to any one of (1) to (18), wherein the movable member configured of a printed circuit board, and the fixed member configured of a stiffener or the printed circuit board.

(20)
The camera module according to any one of (1) to (19), wherein the movable member is supported by an actuator mechanical part so as to move in the direction along the imaging surface.

(21) An electronic device including a camera module, the camera module having:
an image sensor;
a movable member that has the image sensor on the front side and is movable in a direction along the imaging surface of the image sensor;
a fixed member that is fixed with a predetermined gap interposed between the fixed member and the movable member on the back side of the movable member; and
at least one heat dissipating member that is fixed to at least one of the fixed member and the movable member and is in contact with the other in the gap.

Furthermore, the present disclosure can be configured as follows:

(1) A camera module including:
an image sensor;
a movable member that has the image sensor on a front side and is movable in a direction along an imaging surface of the image sensor;
a fixed member that is fixed with a predetermined gap interposed between the fixed member and the movable member on a back side of the movable member; and a plurality of vias that are formed by penetrating from the front side to the back side of the movable member.

(2) The camera module according to (1), further including a heat dissipating layer having a thermal conducting property on the front side of the movable member.

(3) The camera module according to (2), further including a heat dissipating material having a thermal conducting property and provided on the back side of the movable member.

(4) A camera module including:
an image sensor;
a movable member that has the image sensor on a front side and is movable in a direction along an imaging surface of the image sensor;
a fixed member that is fixed with a predetermined gap interposed between the fixed member and the movable member on a back side of the movable member,
wherein the fixed member has a tilted surface that faces the movable member such that a distance from the movable member increases toward the outer edge of the fixed member.

REFERENCE SIGNS LIST

1 Camera module
11 Cabinet
21 Fixed member
31 Image sensor
32 Movable member
40 Actuator mechanical part
51 Chip fixing material
100, 100a to 100g Bump
111 Heat dissipating material
112 Low frictional material
131 Groove
200 Gel material
300 Via
310 Heat dissipating layer
400 Radiator fin
521 Fixed member
600 Bump

What is claimed is:

1. A camera module, comprising:
an image sensor;
a movable member that has the image sensor on a front side and is movable in a direction along an imaging surface of the image sensor;
a fixed member that is fixed with a predetermined gap interposed between the fixed member and a back side of the movable member; and
at least one heat dissipating member that is fixed to at least one of the fixed member and the movable member and is in contact with the other in the gap, wherein the at least one heat dissipating member includes a plurality of heat dissipating members disposed in a staggered pattern.

2. The camera module according to claim 1, wherein the at least one heat dissipating member includes a bump.

3. The camera module according to claim 2, wherein the bump is made of a material having higher thermal conductivity than air.

4. The camera module according to claim 3, wherein the bump is made of a material containing at least one of Au, Ag, Cu, Ni, and solder or includes a protruding portion formed by working on a top surface of the fixed member.

5. The camera module according to claim 1, wherein the at least one heat dissipating member is fixed to the fixed member and is provided in point contact with the movable member.

6. The camera module according to claim 5, further comprising a heat dissipating material having a thermal conducting property and provided on the back side of the movable member,
wherein the at least one heat dissipating member is provided in point contact with the heat dissipating material.

7. The camera module according to claim 5, further comprising a low frictional material provided on the back side of the movable member,
wherein the at least one heat dissipating member is provided in point contact with the low frictional material.

8. The camera module according to claim 5, wherein the at least one heat dissipating member is attached to the fixed member.

9. The camera module according to claim 5, wherein the at least one heat dissipating member is spherical and is fit into a groove formed on the fixed member.

10. The camera module according to claim 1, further comprising a plurality of vias that are formed by penetrating from the front side to the back side of the movable member,
wherein the at least one heat dissipating member includes a plurality of heat dissipating members that are disposed at respective positions corresponding to the plurality of vias.

11. The camera module according to claim 10, wherein the vias are formed in an installation part of the image sensor on the movable member.

12. The camera module according to claim 1, wherein the at least one heat dissipating member is fixed to the movable member and is provided in point contact with the fixed member.

13. The camera module according to claim 1, further comprising, as the at least one heat dissipating member, a first heat dissipating member that is fixed to the fixed member and is provided in point contact with the movable member and a second heat dissipating member that is fixed to the movable member and is provided in point contact with the fixed member.

14. The camera module according to claim 1, wherein the movable member configured of a printed circuit board, and the fixed member configured of a stiffener.

15. A camera module, comprising:
an image sensor;
a movable member that has the image sensor on a front side and is movable in a direction along an imaging surface of the image sensor;
a fixed member that is fixed with a predetermined gap interposed between the fixed member and a back side of the movable member; and
at least one heat dissipating member that is fixed to at least one of the fixed member and the movable member and is in contact with the other in the gap, wherein the at least one heat dissipating member includes a plurality of heat dissipating members that are radially disposed with respect to a center of the image sensor.

16. The camera module according to claim 15, wherein the at least one heat dissipating member includes a bump.

17. The camera module according to claim 16, wherein the bump is made of a material having higher thermal conductivity than air.

18. The camera module according to claim 17, wherein the bump is made of a material containing at least one of Au, Ag, Cu, Ni, and solder or includes a protruding portion formed by working on a top surface of the fixed member.

19. A camera module, comprising:
- an image sensor;
- a movable member that has the image sensor on a front side and is movable in a direction along an imaging surface of the image sensor;
- a fixed member that is fixed with a predetermined gap interposed between the fixed member and a back side of the movable member; and
- at least one heat dissipating member that is fixed to at least one of the fixed member and the movable member and is in contact with the other in the gap, wherein the at least one heat dissipating member includes a plurality of heat dissipating members that are more densely disposed closer to a center of the image sensor.

20. A camera module, comprising:
- an image sensor;
- a movable member that has the image sensor on a front side and is movable in a direction along an imaging surface of the image sensor;
- a fixed member that is fixed with a predetermined gap interposed between the fixed member and a back side of the movable member; and
- at least one heat dissipating member that is fixed to at least one of the fixed member and the movable member and is in contact with the other in the gap, wherein the at least one heat dissipating member includes a plurality of heat dissipating members that are larger in size closer to a center of the image sensor.

* * * * *